(12) United States Patent
Li et al.

(10) Patent No.: US 10,425,586 B2
(45) Date of Patent: Sep. 24, 2019

(54) METHODS, APPARATUSES, AND COMPUTER PROGRAM PRODUCTS FOR IMPROVED PICTURE TAKING

(71) Applicant: Nokia Technologies Oy, Espoo (FI)

(72) Inventors: Xiaoping Li, Beijing (CN); Christian Rossing Kraft, Bangkok (TH)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/772,732

(22) PCT Filed: Mar. 14, 2013

(86) PCT No.: PCT/CN2013/072623
§ 371 (c)(1),
(2) Date: Sep. 3, 2015

(87) PCT Pub. No.: WO2014/139127
PCT Pub. Date: Sep. 18, 2014

(65) Prior Publication Data
US 2016/0028959 A1    Jan. 28, 2016

(51) Int. Cl.
*H04N 5/232* (2006.01)
*H04N 1/387* (2006.01)
(Continued)

(52) U.S. Cl.
CPC .......... *H04N 5/23293* (2013.01); *G06T 7/73* (2017.01); *G06T 11/60* (2013.01); *H04N 1/3871* (2013.01);
(Continued)

(58) Field of Classification Search
CPC .......... H04N 1/00183; H04N 1/00408; H04N 1/0044; H04N 5/23222; H04N 5/23293;
(Continued)

(56) References Cited

U.S. PATENT DOCUMENTS 6,806,906 B1 *  10/2004  Soga ..................... H04N 5/232
                                                      348/333.03
7,224,393 B2 *  5/2007   Ojima .............. H04N 5/23293
                                                      348/333.03
(Continued)

FOREIGN PATENT DOCUMENTS

| CN | 101415074 A | 4/2009 |
| CN | 102045503 A | 5/2011 |
| JP | 2009239397 A | 10/2009 |

OTHER PUBLICATIONS

International Search Report and Written Opinion received for corresponding Patent Cooperation Treaty Application No. PCT/CN2013/072623, dated Dec. 19, 2013, 10 pages.

*Primary Examiner* — Lin Ye
*Assistant Examiner* — Chriss S Yoder, III
(74) *Attorney, Agent, or Firm* — Alston & Bird LLP

(57) ABSTRACT

Methods, apparatuses, and computer program products are herein provided for providing markers for improved picture taking. A method may include causing presentation of information representative of a live environment on a screen. The method may further include receiving user input defining a marker and a position of the marker on the screen over at least a portion of the live environment information. The method may further include causing presentation of the marker in the position on the screen. Corresponding apparatuses and computer program products are also provided.

24 Claims, 15 Drawing Sheets

(51) Int. Cl.
*H04N 5/262* (2006.01)
*G06T 11/60* (2006.01)
*G06T 7/73* (2017.01)

(52) U.S. Cl.
CPC ....... *H04N 1/3872* (2013.01); *H04N 5/23216* (2013.01); *H04N 5/23222* (2013.01); *H04N 5/2621* (2013.01); *G06T 2200/24* (2013.01); *G06T 2207/30204* (2013.01)

(58) Field of Classification Search
CPC ... H04N 5/2621; G06T 11/60; G06T 2200/24; G06F 3/0416; G06F 3/048–04892
See application file for complete search history.

(56) References Cited

U.S. PATENT DOCUMENTS

| | | | | |
|---|---|---|---|---|
| 7,321,391 | B2 * | 1/2008 | Ishige | H04N 1/3872 348/218.1 |
| 7,683,963 | B2 * | 3/2010 | Huang | H04N 5/23212 348/333.02 |
| 8,346,073 | B2 * | 1/2013 | Nose | G03B 17/20 348/333.03 |
| 8,493,495 | B2 * | 7/2013 | D'Souza | G06F 3/0481 348/208.6 |
| 8,508,622 | B1 * | 8/2013 | Anon | H04N 5/23222 348/222.1 |
| 8,509,608 | B2 * | 8/2013 | Kim | H04N 5/23216 396/50 |
| 8,699,750 | B2 * | 4/2014 | Jo | G06K 9/00778 382/103 |
| 9,153,031 | B2 * | 10/2015 | El-Saban | G06K 9/00664 |
| 9,323,432 | B2 * | 4/2016 | Kang | G06F 3/0488 |
| 2003/0169350 | A1 | 9/2003 | Wiezel et al. | |
| 2005/0007468 | A1 | 1/2005 | Stavely et al. | |
| 2009/0141981 | A1 * | 6/2009 | Chan | G06K 9/00255 382/190 |
| 2011/0199387 | A1 | 8/2011 | Newton | |
| 2012/0013645 | A1 * | 1/2012 | Hu | G06F 3/04886 345/667 |
| 2012/0281874 | A1 | 11/2012 | Lure | |
| 2013/0038759 | A1 * | 2/2013 | Jo | H04N 5/2256 348/240.99 |

* cited by examiner

METHODS, APPARATUSES, AND COMPUTER PROGRAM PRODUCTS FOR IMPROVED PICTURE TAKING

RELATED APPLICATION

This application was originally filed as Patent Cooperation Treaty Application No. PCT/CN2013/072623 filed Mar. 14, 2013.

TECHNOLOGICAL FIELD

An example embodiment of the present invention relates generally to user interface technology and, more particularly, relates to methods, apparatuses, and computer program products for providing markers for improved picture taking.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

With increased functionality, mobile computing devices can be used to perform a variety of functions. For example, some mobile computing devices may be configured to function as a camera for taking photographs.

BRIEF SUMMARY

Many people use their mobile computing devices to take pictures. Moreover, often users will ask others to take pictures of them with the mobile computing device. However, the user may want the picture to be taken a certain way, such as having themselves be situated in a certain position within the picture. Along these lines, the user may want an object, such as a building, to be in a specific position within the picture. However, since the user may not be able to view and/or handle the mobile computing device while the picture is being taken, they may need to provide directions to the person taking the picture. This can prove difficult and often results in a less desirable or even unwanted picture.

As such, example embodiments of the present invention provide markers for improved picture taking. Some embodiments of the present invention enable a user to position a marker on the screen currently displaying a live environment. The marker may be positioned such that the picture taker can align a person or object with the marker when taking the picture. This way, the resulting picture will have the person and/or object properly positioned therein.

Example embodiments of the present invention provide markers for improved picture taking. In one example embodiment, a method includes causing presentation of information representative of a live environment on a screen. The method further includes receiving user input defining a marker and a position of the marker on the screen over at least a portion of the live environment information. The method further includes causing presentation of the marker in the position on the screen.

In some embodiments, the position of the marker is associated with a desired position on the screen for object information. Additionally, the object information represents at least one of a person or an object of the live environment. Additionally, in some embodiments, the method includes causing presentation of the marker in the position on the screen to facilitate a user taking a picture of the live environment with the object information representing the at least one person or object being presented on the screen in the desired position.

In some embodiments, the method includes receiving user input defining the marker and the position of the marker by receiving user input defining the position of the marker to be representative of a three-dimensional position of the at least one person or object within the live environment.

In some embodiments, the marker comprises a puppet generally defining the shape of a person. Additionally, in some embodiments, the method includes receiving user input defining the marker by receiving user input repositioning a portion of the puppet with respect to the live environment information so as to define a pose.

In some embodiments, the method includes receiving user input defining the marker by receiving user input adjusting a size of the marker.

In some embodiments, the method includes receiving user input defining the marker by receiving user input defining a geometric shape corresponding to the desired position on the screen for the object information representing the object.

In some embodiments, the method further includes determining a location for the person to stand such that the object information representing the person is presented within the desired position on the screen in an instance in which the user takes the picture. Additionally, the method may further include causing the location to be provided to the user. Additionally, in some embodiments, the method includes determining the location by determining a distance to the location. Moreover, the method may include causing the location to be provided to the user by causing the distance to the location to be provided to the user. In some embodiments, the method includes determining the distance by determining an X coordinate distance and a Y coordinate distance to the location. The X coordinate distance may define a distance in the left or right direction. The Y coordinate distance may define a distance in the forward or backward direction.

In some embodiments, the method further includes receiving user input indicating a user's desire to take a picture and, in response, causing the picture of the live environment being presented on the screen to be taken.

In another example embodiment, an apparatus comprises at least one processor and at least one memory storing computer program code with the at least one memory and stored computer program code being configured, with the at least one processor, to cause the apparatus to cause presentation of information representative of a live environment on a screen. The at least one memory and stored computer program code are configured, with the at least one processor, to further cause the apparatus to receive user input defining a marker and a position of the marker on the screen over at least a portion of the live environment information. The at least one memory and stored computer program code are configured, with the at least one processor, to further cause the apparatus to cause presentation of the marker in the position on the screen.

In another example embodiment, a computer program product is provided. The computer program product of this example embodiment includes at least one computer-readable storage medium having computer-readable program instructions stored therein. The program instructions of this example embodiment comprise program instructions configured to cause an apparatus to perform a method including causing presentation of information representative of a live environment on a screen, The method further includes receiving user input defining a marker and a position of the marker on the screen over at least a portion of the live environment information. The method further includes causing presentation of the marker in the position on the screen.

In another example embodiment, an apparatus is provided. The apparatus comprises means for causing presentation of information representative of a live environment on a screen. The apparatus further comprises means for receiving user input defining a marker and a position of the marker on the screen over at least a portion of the live environment information. The apparatus further comprises means for causing presentation of the marker in the position on the screen.

BRIEF DESCRIPTION OF THE DRAWINGS

Figure 1:
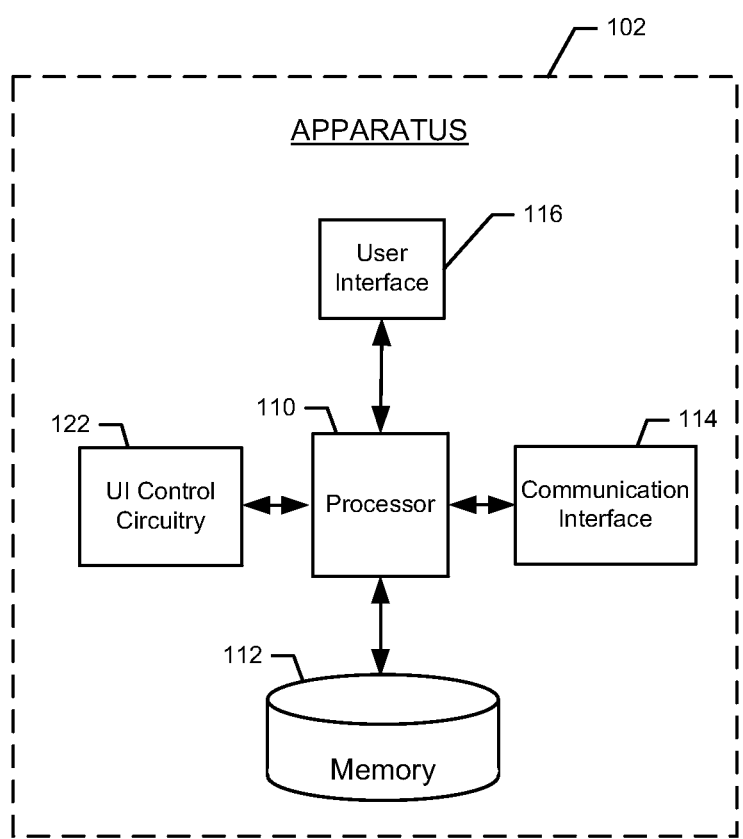
Figure 2:
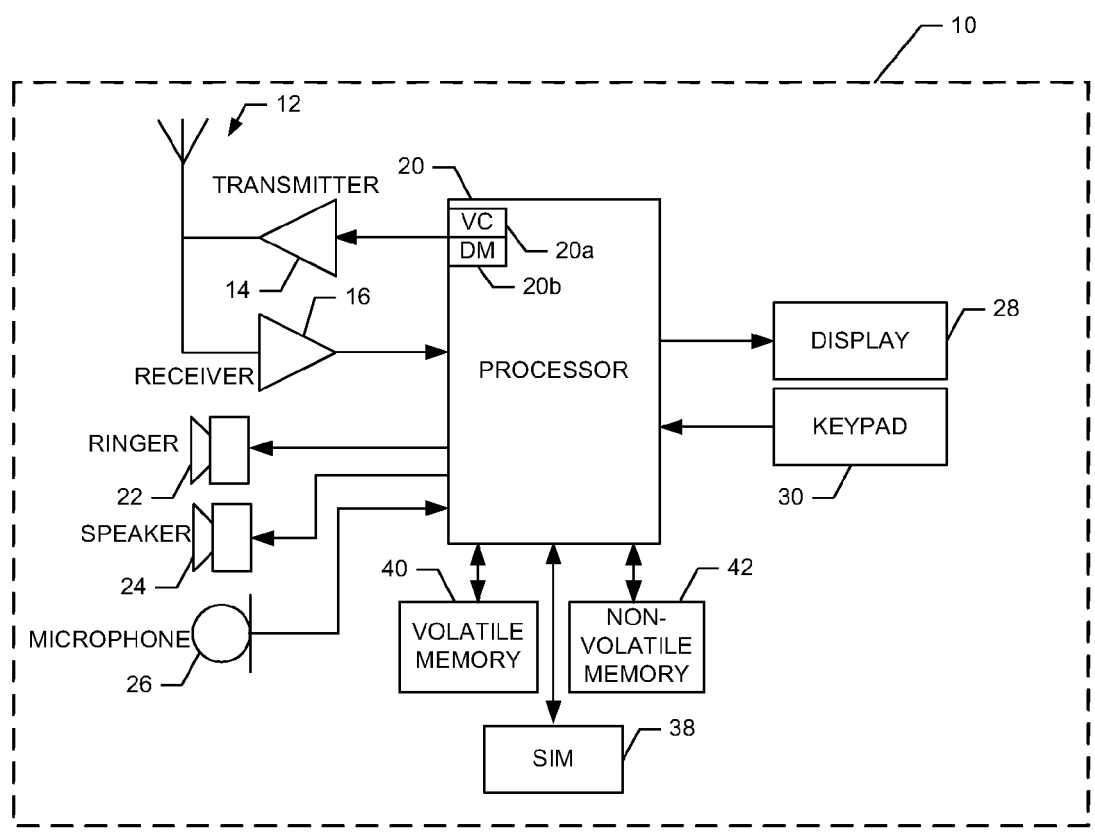
Figure 3:
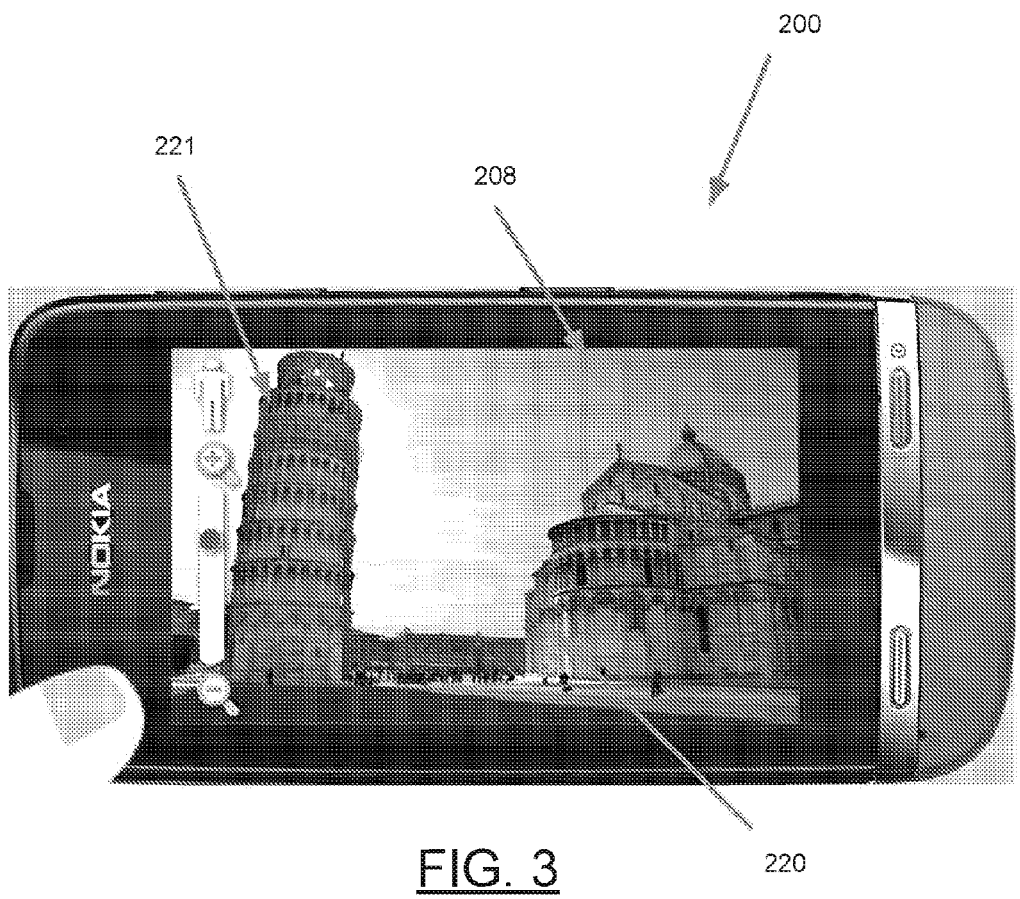
Figure 4:
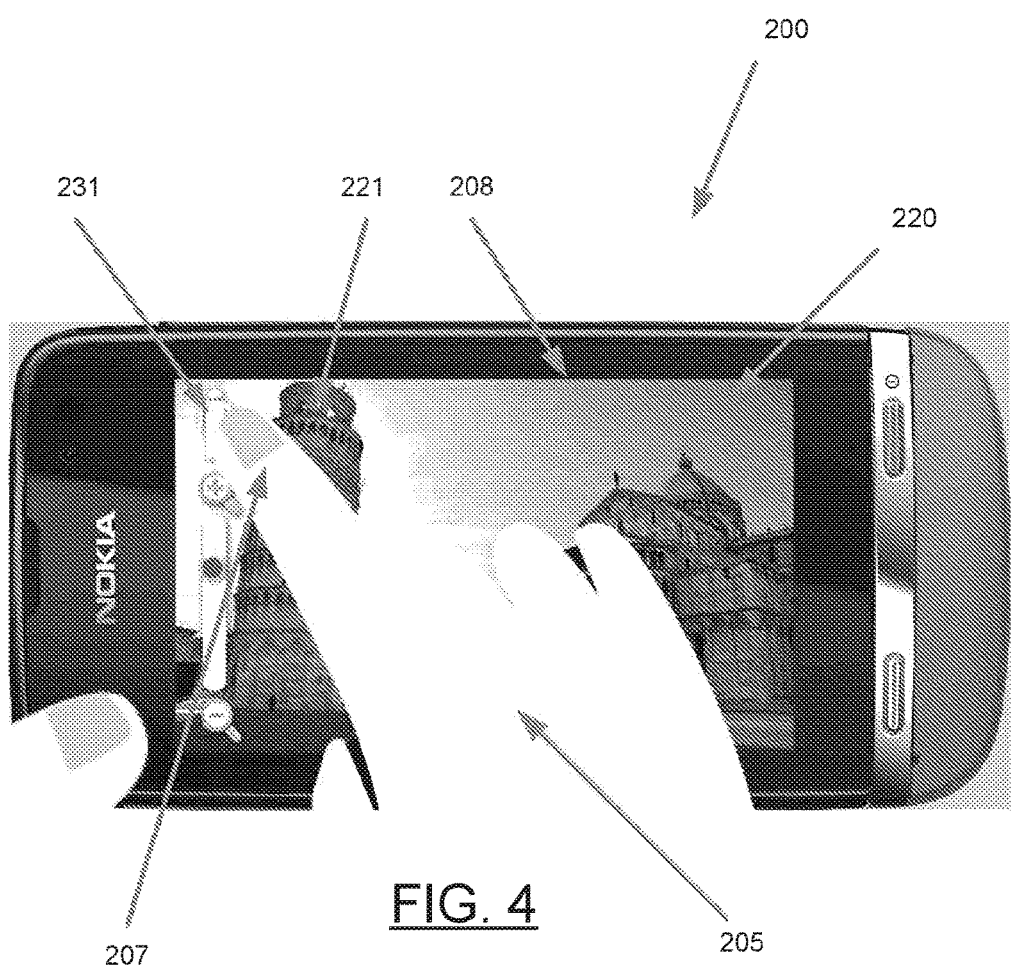
Figure 5:
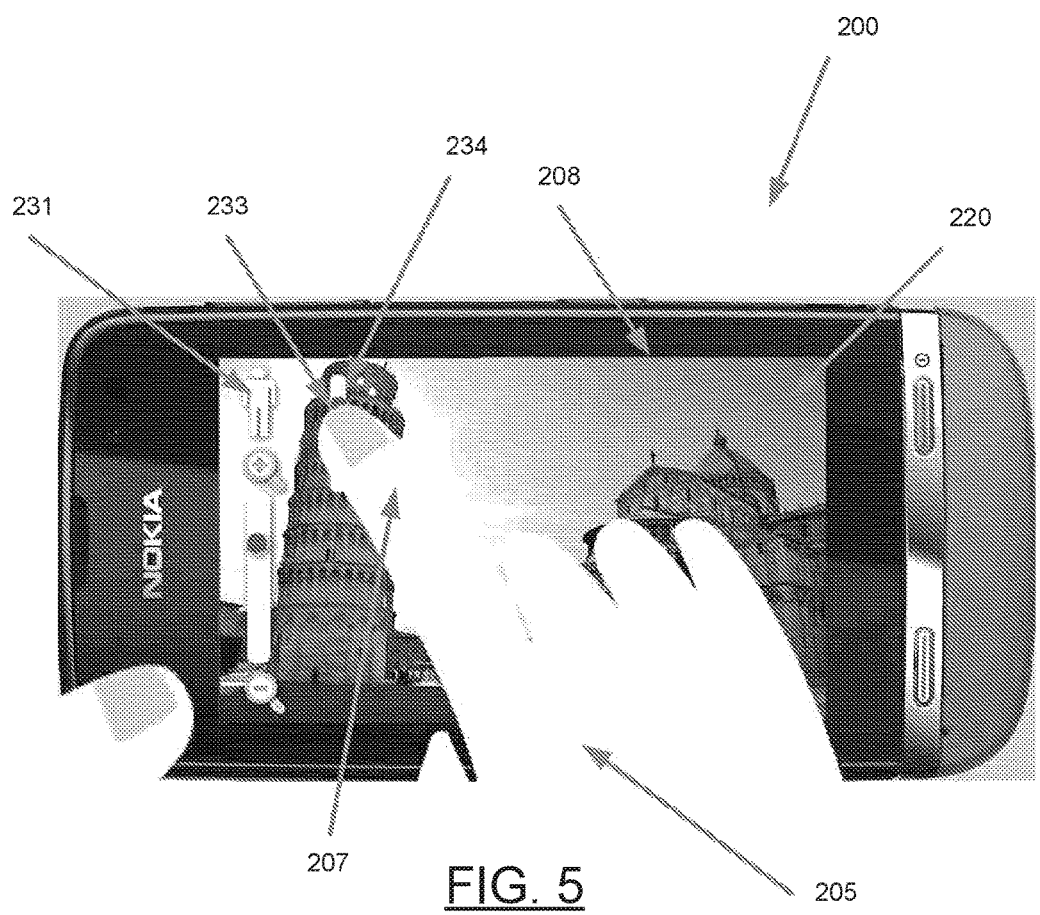
Figure 6:
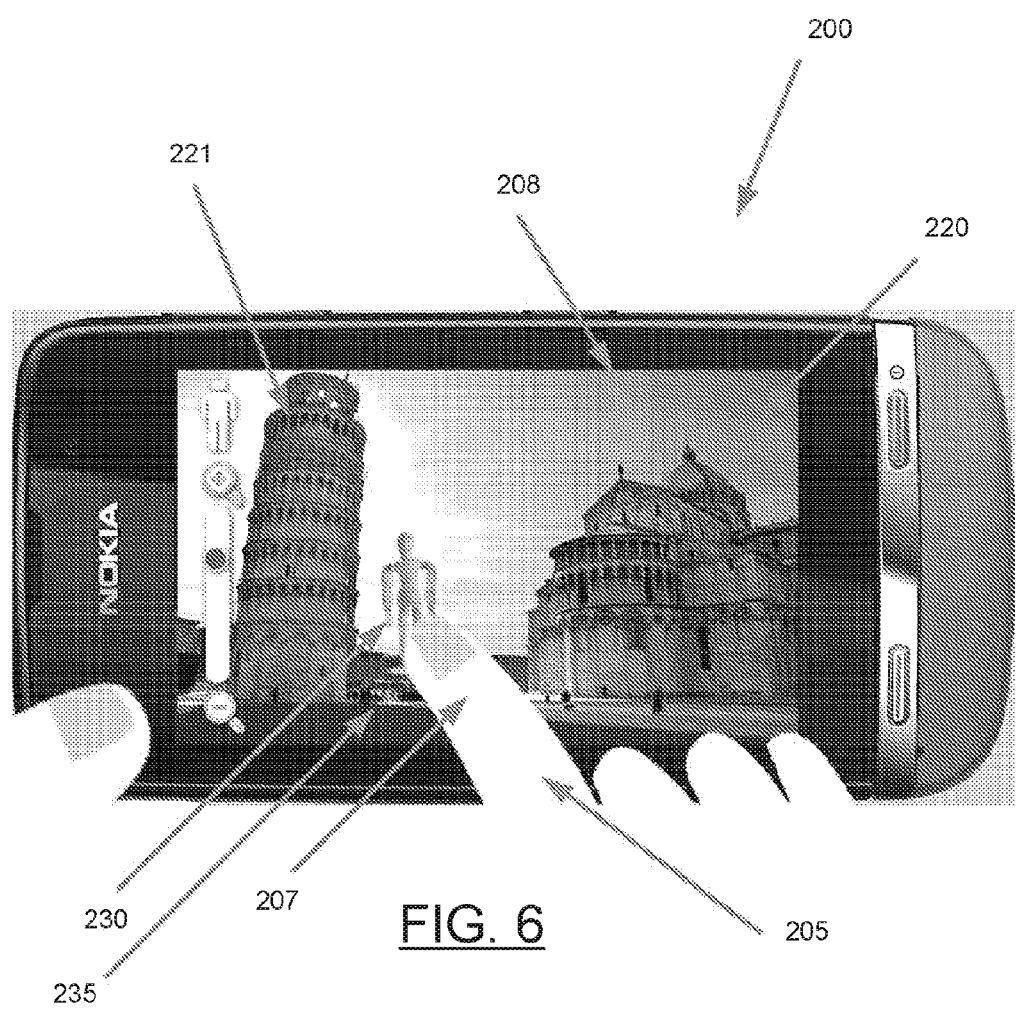
Figure 6A:
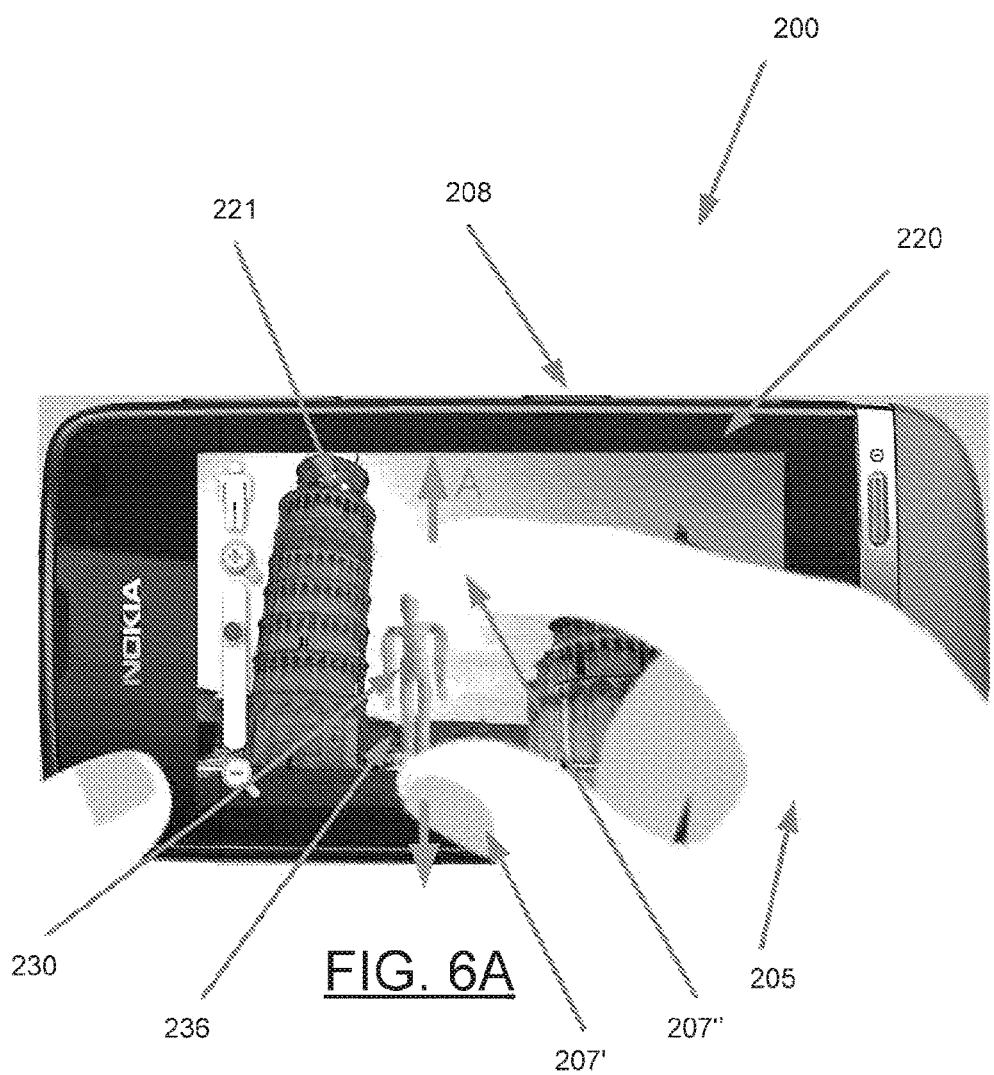
Figure 7:
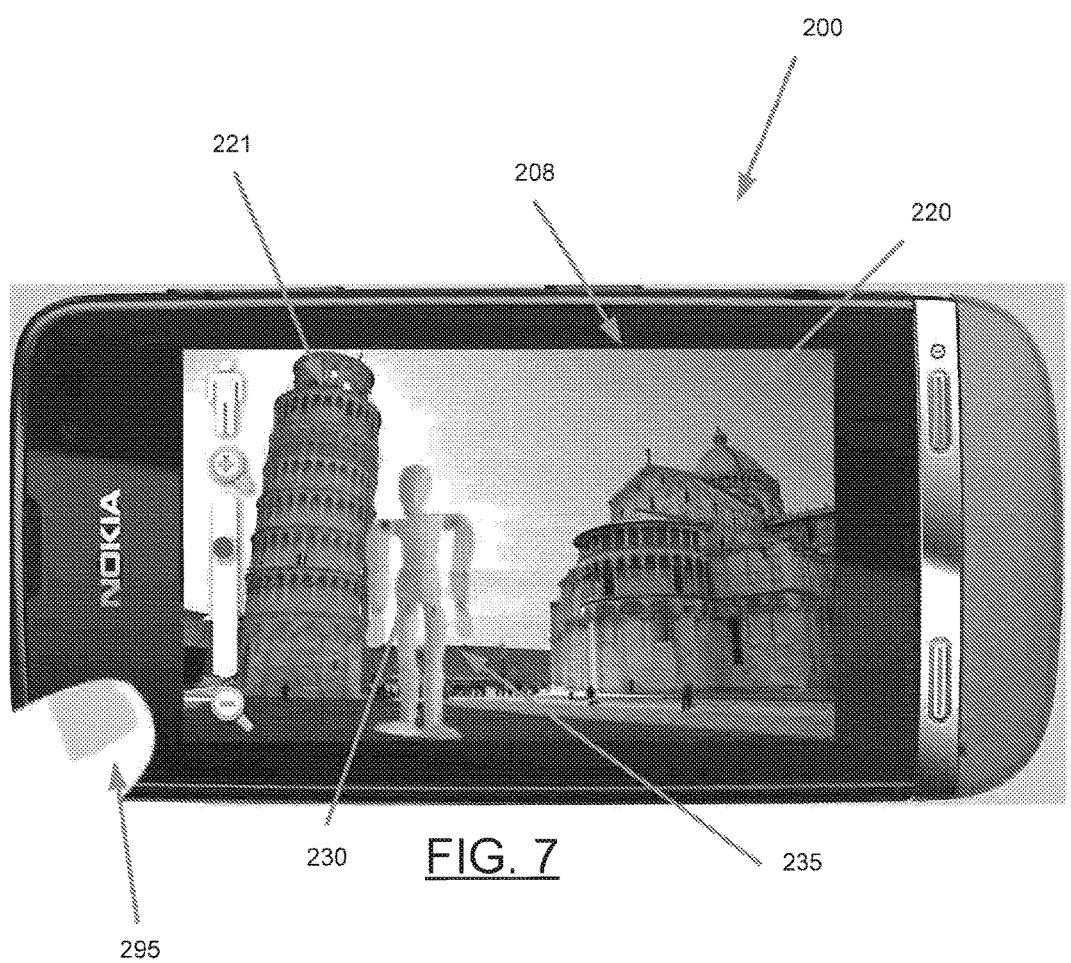
Figure 8:
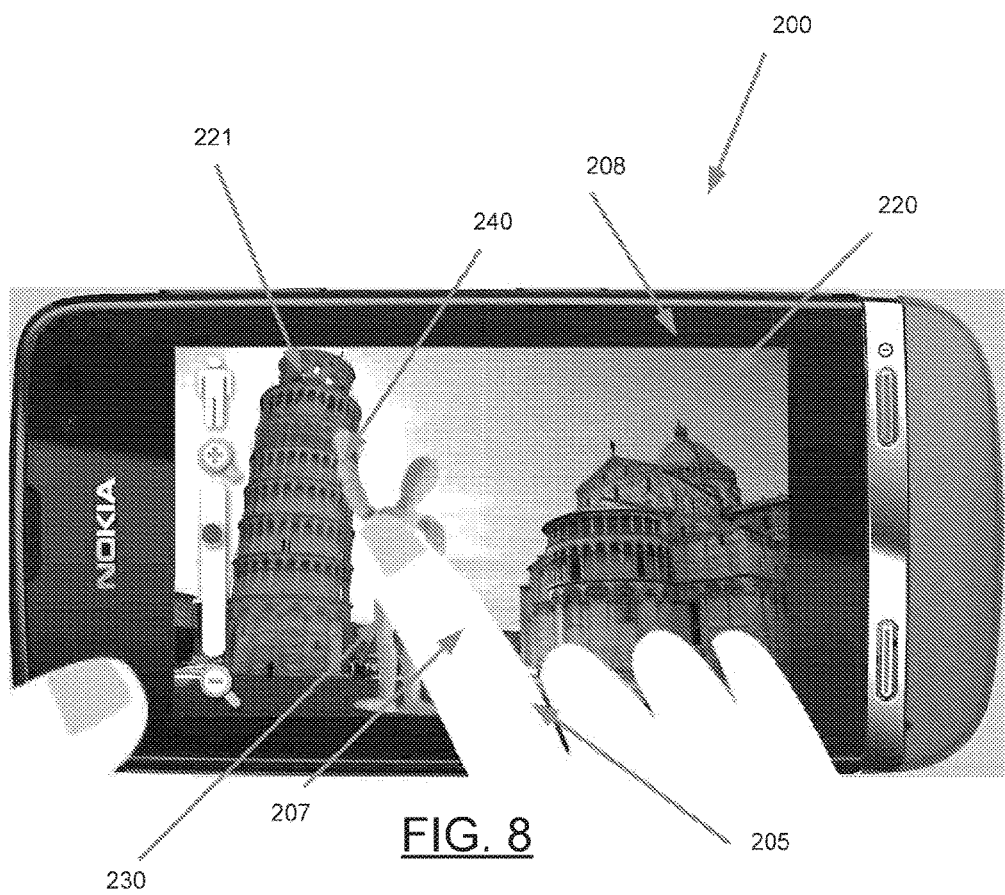
Figure 9:
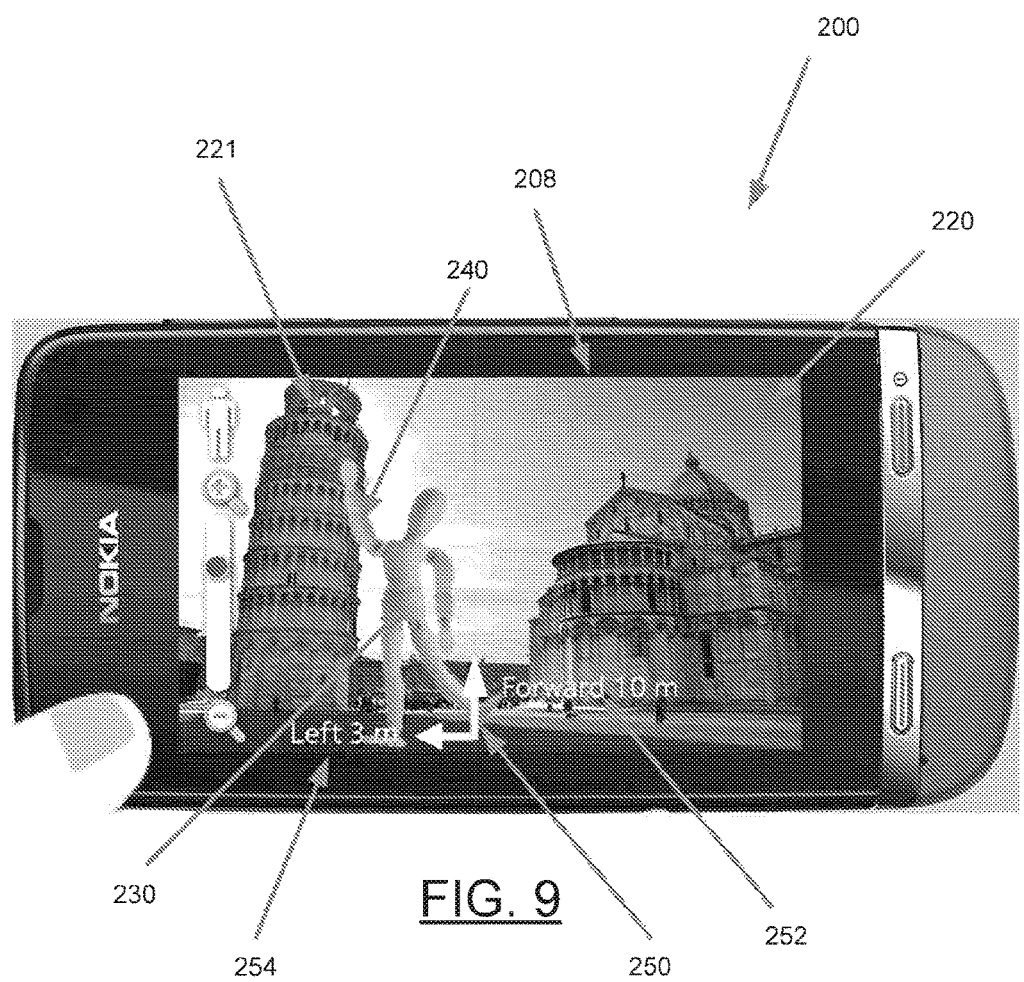
Figure 10:
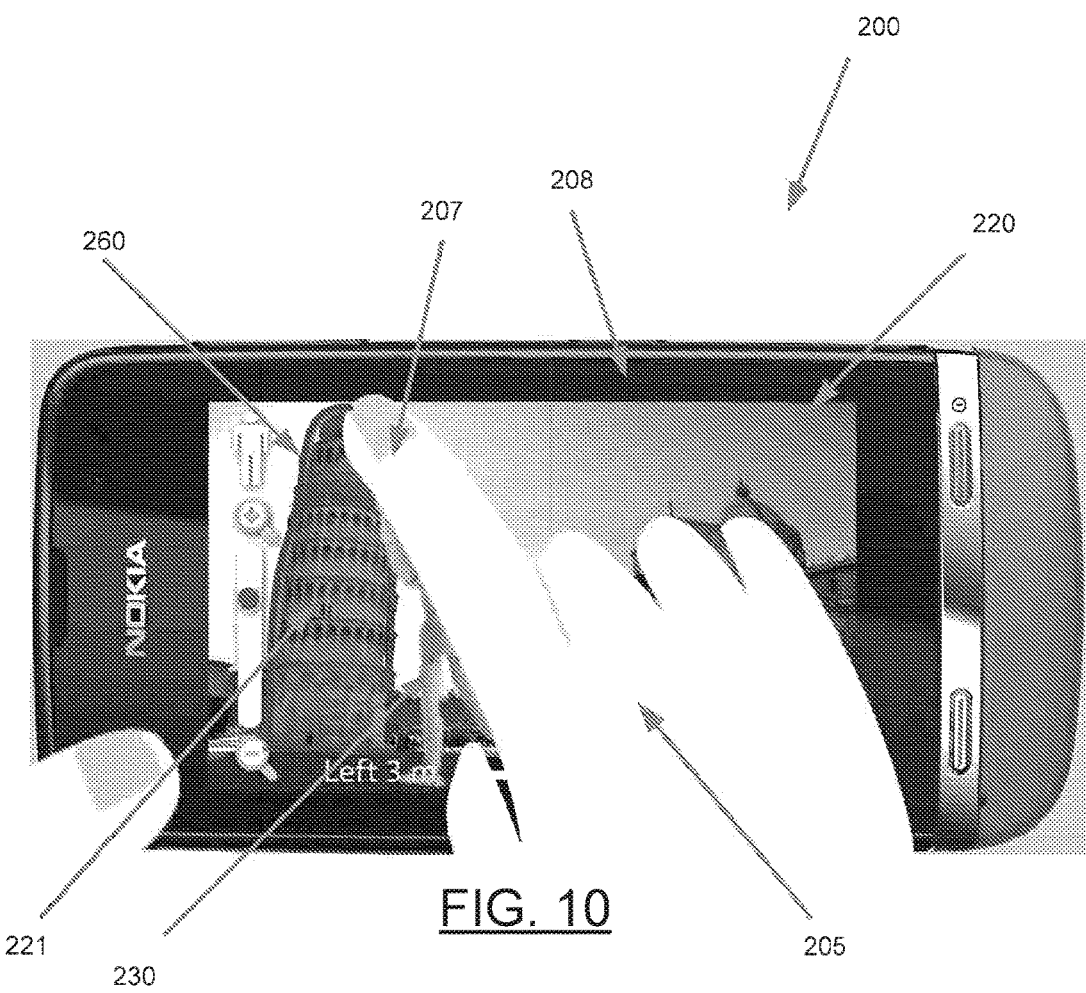
Figure 11:
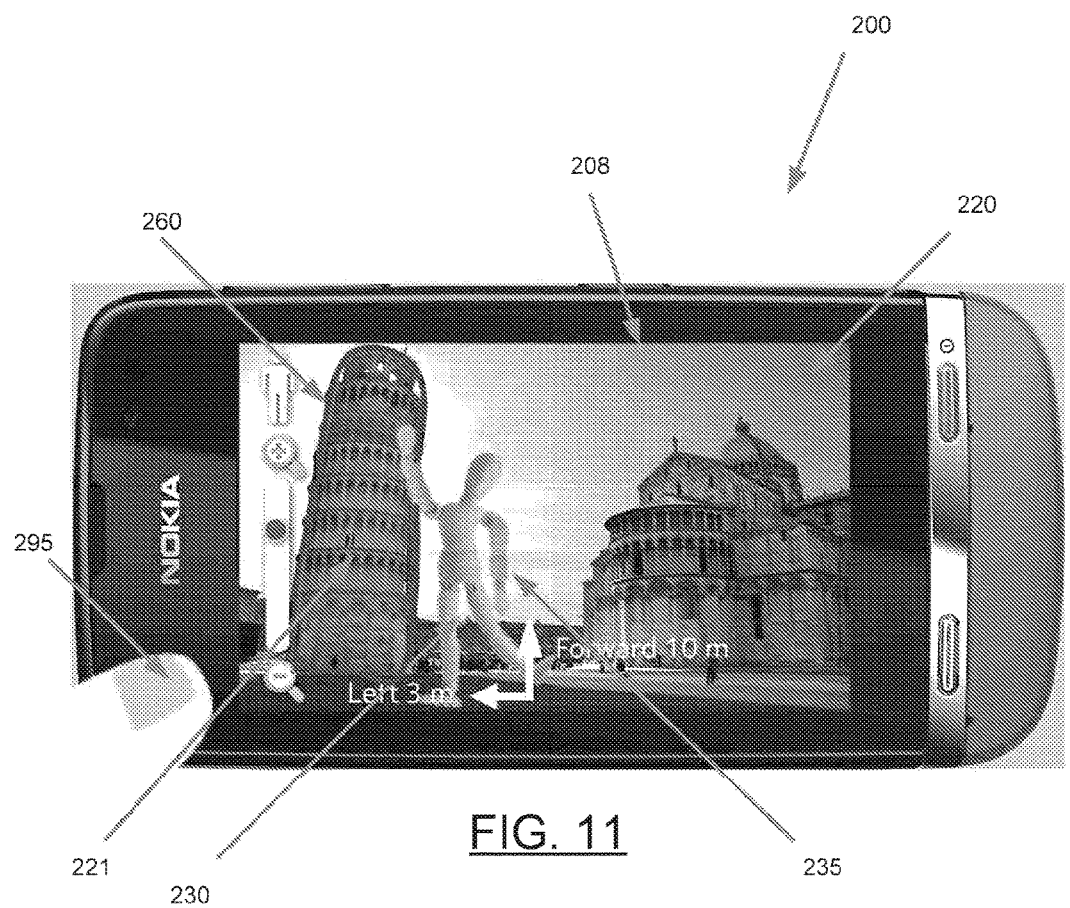
Figure 12:
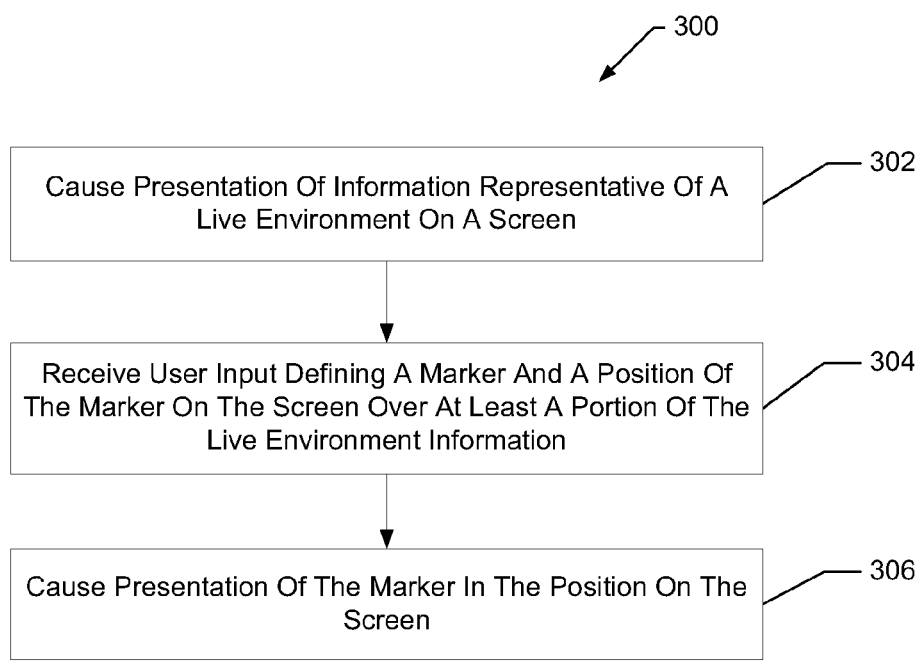
Figure 13:
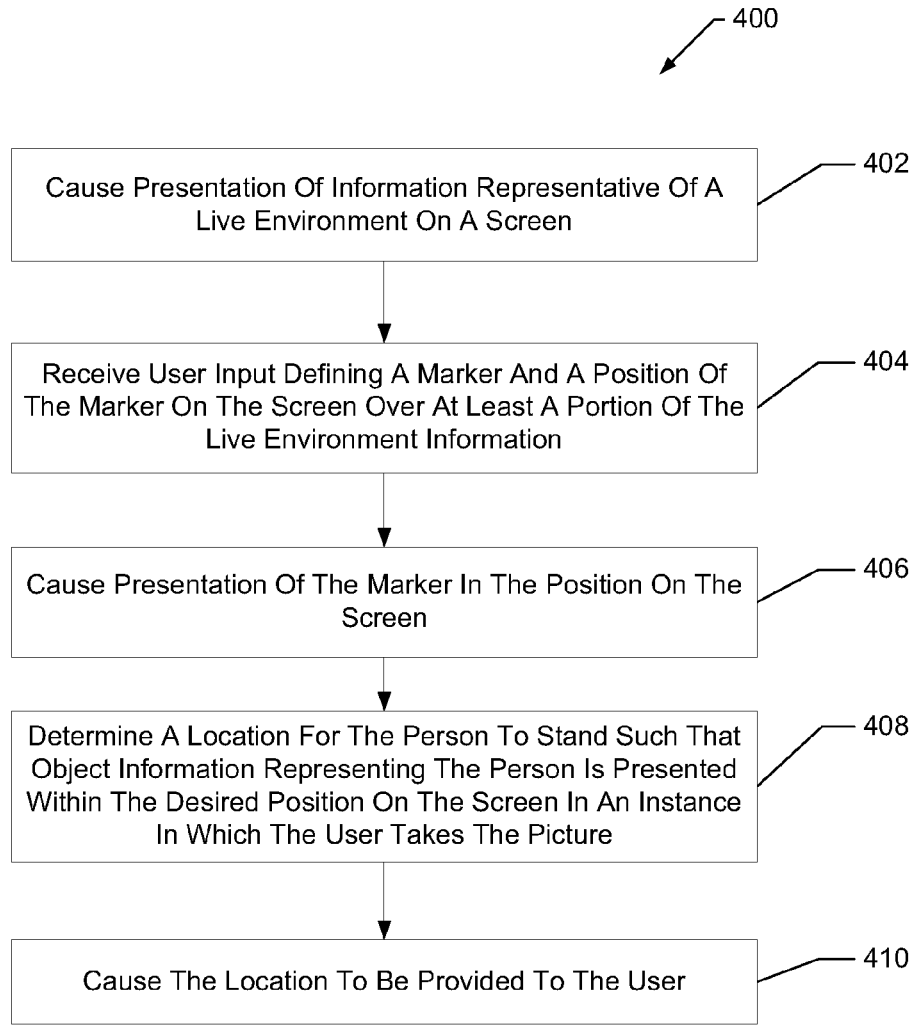
Figure 14:
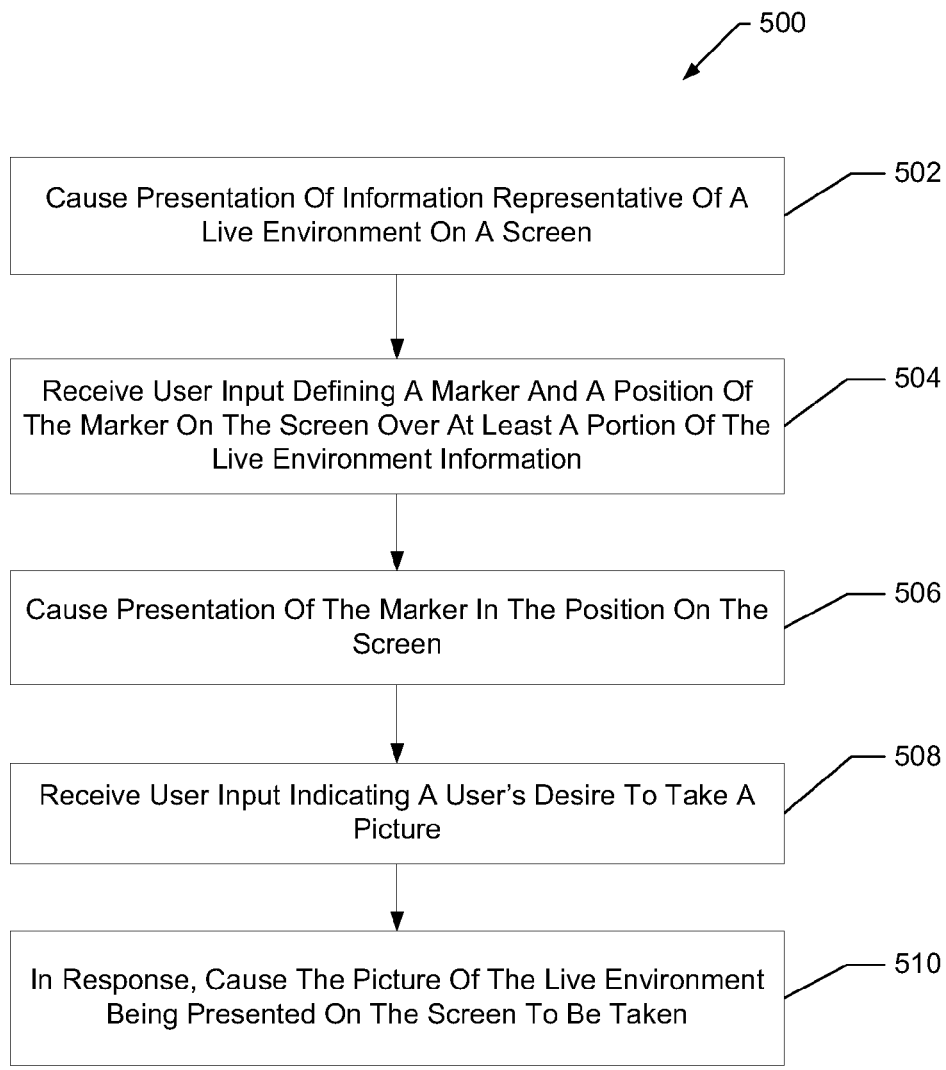

Having thus described some embodiments of the invention in general terms, reference will now be made to the accompanying drawings, which are not necessarily drawn to scale, and wherein:

FIG. 1 illustrates a block diagram of an apparatus according to an example embodiment of the present invention;

FIG. 2 is a schematic block diagram of a mobile terminal according to an example embodiment of the present invention;

FIG. 3 illustrates an example apparatus, such as the apparatus shown in FIG. 1, with information representative of a live environment being presented on a screen, in accordance with an example embodiment of the present invention described herein;

FIG. 4 illustrates the apparatus shown in FIG. 3, wherein a user is providing user input indicating a desire to position a marker on the screen, in accordance with an example embodiment of the present invention described herein;

FIG. 5 illustrates the apparatus shown in FIG. 4, wherein the user is adjusting the size of the marker, in accordance with an example embodiment of the present invention described herein;

FIG. 6 illustrates the apparatus shown in FIG. 4, wherein the user is positioning the marker on the screen, in accordance with an example embodiment of the present invention described herein;

FIG. 6A illustrates the apparatus shown in FIG. 6, wherein the user is adjusting the three-dimensional position of the marker within live environment information, in accordance with an example embodiment of the present invention described herein;

FIG. 7 illustrates the apparatus shown in FIG. 6A, wherein the marker is being presented on the screen in the desired position, in accordance with an example embodiment of the present invention described herein;

FIG. 8 illustrates the apparatus shown in FIG. 7, wherein the user is repositioning a portion of the marker, in accordance with an example embodiment of the present invention described herein;

FIG. 9 illustrates the apparatus shown in FIG. 8, wherein the distance to the location for a person to stand within the live environment that corresponds to the position of the marker on the screen is being presented on the screen, in accordance with an example embodiment of the present invention described herein;

FIG. 10 illustrates the apparatus shown in FIG. 8, wherein the user is providing user input defining a second marker on the screen, in accordance with an example embodiment of the present invention described herein;

FIG. 11 illustrates the apparatus shown in FIG. 10, wherein the first marker and the second marker are being presented on the screen, in accordance with an example embodiment of the present invention described herein;

FIG. 12 illustrates a flowchart according to an example method for providing markers for improved picture taking, in accordance with an example embodiment of the present invention described herein;

FIG. 13 illustrates a flowchart according to another example method for providing markers for improved picture taking, in accordance with an example embodiment of the present invention described herein; and FIG. 14 illustrates a flowchart according to another example method for providing markers for improved picture taking, in accordance with an example embodiment of the present invention described herein.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to singular or plural data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read.

The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of an apparatus 102 configured for providing markers for improved picture taking according to an example embodiment. It will be appreciated that the apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for performing operations and operational routing, other configurations may also be used to implement embodiments of the present invention.

The apparatus 102 may be embodied as either a fixed device or a mobile device such as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In this regard, the apparatus 102 may comprise any computing device that comprises or is in operative communication with a user interface (e.g., a touch display capable of displaying a graphical user interface). In some example embodiments, the apparatus 102 is embodied as a mobile computing device, such as the mobile terminal illustrated in FIG. 2.

In this regard, FIG. 2 illustrates a block diagram of a mobile terminal 10 representative of one example embodiment of an apparatus 102. It should be understood, however, that the mobile terminal 10 illustrated and hereinafter described is merely illustrative of one type of apparatus 102 that may implement and/or benefit from various example embodiments of the invention and, therefore, should not be taken to limit the scope of the disclosure. While several embodiments of the electronic device are illustrated and will be hereinafter described for purposes of example, other types of electronic devices, such as mobile telephones, mobile computers, personal digital assistants (PDAs), pagers, laptop computers, desktop computers, gaming devices, positioning devices, tablet computers, televisions, e-papers, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of communicating according to Wi-Fi, Near Field Communications (NFC), BlueTooth, Worldwide Interoperability for Microwave Access (WiMAX) or other proximity-based communications protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20*a*, an internal data modem (DM) 20*b*, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a projector, a holographic display or the like. The display 28 may, for example, comprise a three-dimensional touch display, examples of which will be described further herein below. The user input interface may comprise devices allowing the mobile terminal to receive data, such as a keypad 30, a touch display (e.g., some example embodiments wherein the display 28 is configured as a touch display), a joystick (not shown), and/or other input device. In embodiments including a keypad, the keypad may comprise numeric (0-9) and related keys (#, *), and/or other keys for operating the mobile terminal 10. Alternatively or additionally, the keypad 30 may include a conventional QWERTY keypad arrangement.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the apparatus 102 includes various means for performing the various functions herein described. These means may comprise one or more of a processor 110, memory 112, communication interface 114, user interface 116, or user interface (UI) control circuitry 122. The means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, and/or UI control circuitry 122 may be embodied as a chip or chip set. The apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20 (shown in FIG. 2). In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42 (shown in FIG. 2). The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, images, content, media content, user data, application data, and/or the like. This stored information may be stored and/or used by the UI control circuitry 122 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. In embodiments wherein the apparatus 102 is embodied as a mobile terminal 10, the communication interface 114 may be embodied as or comprise the transmitter 14 and receiver 16 (shown in FIG. 2). The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. As an example, the communication interface 114 may be configured to receive and/or otherwise access content (e.g., web page content, streaming media content, and/or the like) over a network from a server or other content source. Additionally or alternatively, the communication interface 114 may be configured to support communications in accordance with any proximity-based protocol including, for example, Wi-Fi, NFC, BlueTooth, WiMAX or the like. The communication interface 114 may additionally be in communication with the memory 112, user interface 116, and/or UI control circuitry 122, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touchscreen display, a microphone, a speaker, and/or other input/output mechanisms. In some embodiments, a display may refer to display on a screen, on a wall, on glasses (e.g., near-eye-display), in the air, etc. In embodiments wherein the apparatus 102 is embodied as a mobile terminal 10, the user interface 116 may be embodied as or comprise the display 28 and keypad 30 (shown in FIG. 2). The user interface 116 may be in communication with the memory 112, communication interface 114, and/or UI control circuitry 122, such as via a bus.

The UI control circuitry 122 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In some example embodiments wherein the UI control circuitry 122 is embodied separately from the processor 110, the UI control circuitry 122 may be in communication with the processor 110. The UI control circuitry 122 may further be in communication with one or more of the memory 112, communication interface 114, or user interface 116, such as via a bus.

The UI control circuitry 122 may be configured to receive user input from a user interface 116, such as a touch display (e.g., touchscreen). The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the UI control circuitry 122 may determine a position of the user input such as for determining a portion of the display to which the user input correlates.

The touch display may also be configured to enable the detection of a hovering gesture input. A hovering gesture input may comprise a gesture input to the touch display without making physical contact with a surface of the touch display, such as a gesture made in a space some distance above/in front of the surface of the touch display. As an example, the touch display may comprise a capacitive touch display, which may be configured to enable detection of capacitance of a finger or other input object by which a gesture may be made without physically contacting a display surface. As another example, the touch display may be configured to enable detection of a hovering gesture input through use of acoustic wave touch sensor technology, electromagnetic touch sensing technology, near field imaging technology, optical sensing technology, infrared proximity sensing technology, some combination thereof, or the like.

As noted above, the apparatus 102 (shown in FIG. 1) may be configured to perform operations. Indeed, in some embodiments, the apparatus 102 may be configured to function as a camera in order to take a photograph (e.g., picture) of a live environment. In some embodiments, the apparatus 102, such as through the user interface 116 and/or UI control circuitry 122, may be configured to cause presentation of information representative of a live environment. Indeed, in some embodiments, the live environment information may be presented to aid a user in taking the photograph. For example, the user may view what the picture would capture if taken at that moment. In this regard, the information being presented is live such that if the view of the camera changes or something in the live environment changes, the information being presented on the screen changes accordingly.

FIG. 3 illustrates an example apparatus 200 (such as may embody apparatus 102). The apparatus 200 may include a screen 208 and a camera (not shown). The camera may be directed toward a live environment. The live environment may be presented on the screen 208 as information representing the live environment 220. For example, in the depicted embodiment, the live environment may include the Leaning Tower of Pisa and, thus, the live environment information 220 may include an image of the Leaning Tower of Pisa 221 as seen in the live environment.

In some embodiments, the apparatus 102, such as through the processor 110, may be configured to cause a picture of the live environment to be taken. Along these lines, in some embodiments, the apparatus 102, such as through the user interface 116, UI control circuitry 122, and/or processor 110, may be configured to receive user input indicating a user's desire to take the picture and, in response, cause the picture of the live environment to be taken.

Considering the usefulness of the above noted camera features and the ability of users to carry mobile computing devices (e.g., apparatus 102 shown in FIG. 1), users may now rely on their mobile computing devices to capture photographs where ever they go. Along these lines, users may often want a picture to be taken and may request someone else to take the picture. However, the user may also want the picture to be taken a certain way, such as having themselves be situated in a certain position within the picture. Similarly, the user may want an object, such as a building, to be situated in a desired position within the picture. However, since the user may not be able to view and/or handle the mobile computing device while the picture is being taken, they may need to provide directions to the person taking the picture. Performing such a task verbally, however, may prove difficult and may lead to a less desirable or even unwanted picture.

As such, example embodiments of the present invention seek to provide markers for improved picture taking. Indeed, some embodiments of the present invention enable a user to position a marker on the screen currently displaying information representing a live environment. The marker may be positioned over the live environment information such that the picture taker can, using the marker, align a person or object properly within the picture. Said differently, the picture taker can align the marker with the information representing the person (or direct the person such that the information representing the person aligns with the marker) so that the resulting picture accords with what is desired by the user. The same concept can also be applied to other objects, such as buildings, landmarks, etc.

In some embodiments, the apparatus 102, such as through the user interface 116 and/or UI control circuitry 122, may be configured to receive user input indicating a user's desire to position a marker on the screen over live environment information. In some embodiments, the apparatus 102, such as through the user interface 116 and/or UI control circuitry 122, may be configured to receive user input selecting a marker to be positioned on the screen. For example, with reference to FIG. 4, a user 205 may select a marker icon 231 with their finger 207 to indicate that they wish to position a marker on the screen 208 over the live environment information 220.

Though the depicted embodiment details a user selecting a marker icon to indicate a desire to position a marker on the screen, some embodiments of the present invention contemplate any number of ways for a user to indicate a desire to position a marker on the screen. For example, the apparatus 102 may be configured to recognize an associated gesture, such as the user swiping two fingers across the screen, as an indication that the user wishes to position a marker on the screen.

In some embodiments, the apparatus 102, such as through the user interface 116 and/or UI control circuitry 122, may be configured to receive user input defining a marker and a position of the marker on the screen over at least a portion of the live environment information.

In some embodiments, the user may provide user input to define the marker. Additionally or alternatively, in some embodiments, the marker may define a pre-defined shape. For example, as noted herein, a marker may be defined in the shape of a person (e.g., a puppet) or any geometric shape (e.g., a shape). Moreover, in some embodiments, the shape of the marker may be adjusted by the user.

In some embodiments, the size of the marker may be defined by the user. In some embodiments, the apparatus 102, such as through the user interface 116 and/or UI control circuitry 122, may be configured to receive user input defining the size of the marker. Some embodiments of the present invention contemplate any number of ways for the user to define the size of the marker (e.g., perform a pinch gesture directed toward the marker to make the marker smaller, perform a reverse pinch gesture toward the marker to make the marker larger, provide input on a scroll bar to define the size of the marker, etc.). For example, with reference to FIG. 5, after selecting the marker 231, a height selection bar 234 may be presented on the screen. The user 205 may drag an icon 233 within the height selection bar 234 representing different sizes for the marker (e.g., different heights for the puppet). For example, if the user 205 wants the puppet 230 to represent a short person (e.g., a child), the user 205 may drag the icon 233 lower on the height selection bar 234. In contrast, the user may drag the icon 233 higher on the height selection bar 234 if the user 205 wants the puppet 230 to represent a tall person. Accordingly, the puppet 230 may adjust in size and define that size when presented on the screen 220 (e.g., shown in FIG. 6).

In some embodiments, size indicators may be presented to the user to aid in defining of the size of the marker. In some embodiments, the apparatus 102, such as through the user interface 116 and/or UI control circuitry 122, may be configured to cause presentation height indicators to aid a user in defining the desired size of the marker. For example, in some embodiments, height indicators (e.g., 1.8 meters, 5 feet, 6 feet and 1 inch, etc.) may be presented, such as near the corresponding position along the height selection bar 234 (shown in FIG. 5).

Though some depicted embodiments detail a pre-defined shape of a person, some embodiments of the present invention contemplate other pre-defined shapes (e.g., a circle, a square, a differently-shaped person, a dog shape, etc.). Along these lines, some embodiments of the present invention contemplate enabling the user to select from among any number of available pre-defined shapes. Further, though the depicted embodiment details a pre-defined shape, as noted above, some embodiments of the present invention contemplate enabling the user to provide user input to define the shape. For example, the user may draw a geometric shape on the screen to define the marker (see e.g., FIG. 10 and the related description herein).

As noted herein, some embodiments of the present invention provide for improved picture taking by presenting a marker in a position on the screen of the apparatus taking the picture. The marker may be representative of where a person (or object) should be positioned within the live environment to form the picture that the user desires. In such a regard, in some embodiments, the position of the marker is associated with a desired position on the screen of object information representative of at least one of a person or an object in the live environment. The object information may be the information presented on the screen that represents the person or object in the live environment. For example, with reference to FIG. 6, the image of the Leaning Tower of Pisa 221 may be object information because it is representative of an object (the actual Leaning Tower of Pisa (not shown)) in the live environment. Notably, however, in FIG. 6, it may be desirable to place the puppet 230, which represents an image of a person (e.g., object information), in a desired position 235 on the screen 208 to represent a position within the live environment for the person to stand. To help explain, since the apparatus 200 is showing live environment information, the image of the person will appear once the person enters the portion of the live environment being displayed.

Along these lines, in some embodiments, the position of the marker on the screen may be representative of a three-dimensional position of the at least one person or object within the live environment. Said differently, the position of the marker (which is presented on the screen) represents where the corresponding person or object should appear on the screen when the picture is taken. However, in order to appear on the screen in the position of the marker, the corresponding person or object must be situated in a certain position within the live environment.

As such, in some embodiments, the user may provide user input to define the position of the marker on the screen. Some embodiments of the present invention contemplate any number of ways for the user to define the position of the marker (e.g., drag the marker, double tap in the desired position, etc.). For example, with reference to FIG. 6, a puppet 230 in the shape of a person may be presented on the screen 208 over at least a portion of the live environment information 220. The user 205 may drag the puppet 230, such as with their finger 207, across the screen 208 to the desired position over the live environment information 220.

In some embodiments, the perceived three-dimensional position of the marker within the live environment information may be adjusted/defined. In some embodiments, the apparatus 102, such as through the user interface 116 and/or UI control circuitry 122, may be configured to receive user input defining the position of the marker to be representative of a three-dimensional position of the at least one person or object within the live environment. Said differently, the apparatus 102, such as through the user interface 116 and/or UI control circuitry 122, may be configured to receive user input defining and/or adjusting the three-dimensional position of the marker within the live environment information. Some embodiments of the present invention contemplate any number of ways for the user to define and/or adjust the three-dimensional position of the marker within the live environment information (e.g., perform a pinch gesture directed toward the marker to make the marker appear further away within the live environment information, perform a reverse pinch gesture toward the marker to make the marker appear closer within the live environment information, provide input on a scroll bar to redefine the perceived three-dimensional position of the marker, etc.).

In some embodiments, the apparatus 102 may be configured to define/adjust the three-dimensional position of the marker based on a set size (e.g., height) of the marker (e.g., as defined previously, such as in the example of FIG. 5). Indeed, in some embodiments, while the user is defining the position (and/or perceived three-dimensional position) of the marker, the size of the marker may be fixed. In such a regard, in some embodiments, the "position" of the marker on the screen may be based on the size of the marker, the two-dimensional position on the screen, and the perceived three-dimensional position of the marker within the live environment information.

For example, with reference to FIG. 6A, the user 205 may perform user input directed toward the puppet 230 to redefine the three-dimensional position of the puppet 230. For example, the user, such as with their thumb 207' and finger 207", is performing a reverse pinch gesture (e.g., along arrow A). In such a manner, the apparatus 200 will adjust the perceived three-dimensional position 236 of the puppet 230 so as to "move" the puppet 230 toward the apparatus 200 (e.g., the puppet 230 appears to enlarge as it "moves" closer to the apparatus 200, shown in FIG. 7).

In such a regard, in some embodiments, the apparatus 102, such as through the processor 110, user interface 116, and/or UI control circuitry 122, may be configured to cause presentation of the marker in the position on the screen over at least a portion of the live environment information. For example, with reference to FIG. 7, the apparatus 200 may cause presentation of the marker 230 in the position 235 that was previously defined by the user (shown in FIGS. 5, 6, and 6A). In the depicted embodiment, the puppet 230 is presented on the screen 208 so as to appear next to the Leaning Tower of Pisa 221.

In some embodiments, the apparatus 102, such as through the processor 110, user interface 116, and/or UI control circuitry 122, may be configured to cause presentation of the marker in the position on the screen to facilitate a user taking a picture of the live environment with the object information representing the at least one person or object being presented on the screen in the desired position. Indeed, the picture taker can either maneuver the apparatus 102 or direct the person whose picture is being taken into a position such that the object information aligns with the marker. For example, with reference to FIG. 7, the picture taker 295 can ask the person whose picture is being taken (not shown) to stand in a position within the live environment that will cause their image to align with the puppet 230 when presented on the screen 208. In such a regard, the person will be properly positioned within the picture. Such an embodiment enables the desired picture to be taken without difficulty and unnecessary or hard to follow verbal directions.

In some embodiments, the apparatus 102, such as through the processor 110, user interface 116, and/or UI control circuitry 122, may be configured to receive user input repositioning a portion of the marker with respect to the live environment information. In some embodiments in which the marker defines a puppet (e.g., the shape of a person), the apparatus 102, such as through the processor 110, user interface 116, and/or UI control circuitry 122, may be configured to receive user input repositioning a portion of the puppet with respect to the live environment information so as to define a pose. In such an embodiment, the puppet may define a pose for the corresponding person to perform for the picture. For example, with reference to FIG. 8, the user 205 may reposition the arm 240 of the puppet 230 by dragging the arm 240 along the screen 208 (such as with their finger 207). With reference to FIG. 9, the puppet 230 defines a pose with the arm 240 appearing to "touch" or "hold up" the Leaning Tower of Pisa.

Though the embodiment of the present invention described above includes repositioning of the arm of the puppet, some embodiments of the present invention contemplate repositioning of any portion of the marker (e.g., head, leg, finger, etc.). For example, in some embodiments, a user may provide user input directed to the fingers of the puppet to reposition them such that the fingers of the puppet define a pose (e.g., the puppet may appear to pick up the sunset in the live environment information). Likewise, some embodiments of the present invention contemplate repositioning of a portion of any shaped marker (e.g., a portion of a star-shaped marker, a portion of a circle-shaped marker, etc.)

In some embodiments, the apparatus 102, such as through the processor 110, may be configured to determine the location that the person or object needs to be within the live environment to align with the position of the marker on the screen. Knowing this location may be useful for directing the person or object within the live environment to further aid in proper positioning for the picture. In some embodiments in which the marker is associated with a person, the apparatus 102, such as through the processor 110, may be configured to determine a location for the person to stand such that the object information representing the person will be presented within the desired position on the screen (e.g., the image of the person will align with the marker). Further, in some embodiments, the apparatus 102, such as through the processor 110, may be configured to determine a distance to the location. This distance may, in some embodiments, comprise an X coordinate distance and a Y coordinate distance to the location. In some cases, the X coordinate distance may define a distance in the left or right direction (from the perspective of the apparatus 102) and the Y coordinate distance may define a distance in the forward or backward direction (from the perspective of the apparatus 102).

Additionally, in some embodiments, the apparatus 102, such as through the user interface 116 and/or UI control circuitry 122, may be configured to cause the location to be provided to the user. Along these lines, in some embodiments, the apparatus 102, such as through the user interface 116 and/or UI control circuitry 122, may be configured to cause the distance to the location to be provided to the user. The location and/or distance to the location may be provided to the user in any number of different ways (e.g., visually, audibly, etc.). For example, with reference to FIG. 9, the apparatus 200 has determined the distance to the location for which the person whose picture is being taken should stand. In particular, the apparatus 200 has determined that the person needs to travel 3 meters to the left and 10 meters forward from the apparatus 200. In the depicted embodiment, the apparatus 200 has presented directions in the form of two arrows 250 and corresponding distances of "Left 3 m" 254 and "Forward 10 m" 252.

In some embodiments, a user may desire for a certain object to be situated in a desired position in a picture. In this regard, in some embodiments, the apparatus 102, such as through the processor 110, user interface 116, and/or UI control circuitry 122, may be configured to receive user input defining a geometric shape corresponding to a desired position on the screen for object information representing an object of the live environment. In such a regard, the user may define a marker for instructions on where the object should be positioned within the picture. For example, with reference to FIG. 10, a user 205 may desire that the Leaning Tower of Pisa be in a desired position within the picture. The user 205 may draw a shape 260 with their finger 207 that outlines the Leaning Tower of Pisa 221. The shape 260 may define a marker that indicates the desired position of the image of the Leaning Tower of Pisa 221. In such a regard, with reference to FIG. 11, the shape 260 may provide guidance for the picture taker 295 for making sure that the image of the Leaning Tower of Pisa 221 is properly positioned in the picture.

Though the depicted embodiment of FIG. 11 details both a shape 260 and a puppet 230, some embodiments of the present invention contemplate any number of markers. For example, only the outline 260 may be presented on the screen 208. Likewise, additional markers (e.g., puppets and/or shapes) may be presented on the screen over a portion of the live environment.

In some embodiments, the apparatus 102, such as through the processor 110, user interface 116, and/or UI control circuitry 122, may be configured to determine a shape of a marker for object information based on user input directed to the object information being presented on the screen. In such an embodiment, the user may provide input directed to object information on a screen. Such input may indicate that the user desires a marker to be presented at that position for aiding a picture taker in aligning the object with the marker to take a desired picture. In such a regard, in response to the receiving the user input directed to the object information, the apparatus 102 may determine a shape of a marker that corresponds to the object information. For example, the apparatus 102 may determine a shape that outlines the object information on the screen. In some embodiments, the apparatus 102 may be configured to determine the shape of the marker based on properties of the live environment information, such as the depth of field of the images on the screen. For example, the determined shape may be based on colors presented on the screen (e.g., similar colors and/or contrast between colors may help define the object). For example, with reference to FIG. 11, the Leaning Tower of Pisa 221 defines similar grey colors and the areas of green (e.g., the grass) or blue (e.g., the sky) define boundaries for the determined marker (e.g., shape 260).

Further, the apparatus 102, such as through the processor 110, user interface 116, and/or UI control circuitry 122, may be configured to cause presentation of the determined marker in the desired position. Such an example embodiment of the present invention provides a simple and automatic way for a user to create a marker for an object to help a picture taker situate the object information in the desired position for the picture. For example, with reference to FIG. 11, in such an embodiment that is consistent with the above description, the user (instead of defining the shape 260) may have provided user input "selecting" the Leaning Tower of Pisa 221. In response, the apparatus 200 may have determined the size and position of the marker (e.g., shape 260) and caused presentation of the shape 260 in a position on the screen 208 around the Leaning Tower of Pisa 221.

Embodiments of the present invention provide methods, apparatus and computer program products for providing markers for improved picture taking. Various examples of the operations performed in accordance with embodiments of the present invention will now be provided with reference to FIGS. 12-14.

FIG. 12 illustrates a flowchart according to an example method for providing markers for improved picture taking according to an example embodiment 300. The operations illustrated in and described with respect to FIG. 12 may, for example, be performed by, with the assistance of, and/or under the control of one or more of the processor 110, memory 112, communication interface 114, user interface 116, or UI control circuitry 122 (shown in FIG. 1). Operation 302 may comprise causing presentation of information representative of a live environment on a screen. The processor 110, user interface 116, and/or UI control circuitry 122 may, for example, provide means for performing operation 302. Operation 304 may comprise receiving user input defining a marker and a position of the marker on the screen over at least a portion of the live environment information. The processor 110, user interface 116, and/or UI control circuitry 122 may, for example, provide means for performing operation 304. Operation 306 may comprise causing presentation of the marker in the position on the screen. The processor 110 may, for example, provide means for performing operation 306.

FIG. 13 illustrates a flowchart according to another example method for providing markers for improved picture taking according to an example embodiment 400. The operations illustrated in and described with respect to FIG. 13 may, for example, be performed by, with the assistance of, and/or under the control of one or more of the processor 110, memory 112, communication interface 114, user interface 116, or UI control circuitry 122 (shown in FIG. 1). Operation 402 may comprise causing presentation of information representative of a live environment on a screen. The processor 110, user interface 116, and/or UI control circuitry 122 may, for example, provide means for performing operation 402. Operation 404 may comprise receiving user input defining a marker and a position of the marker on the screen over at least a portion of the live environment information. The processor 110, user interface 116, and/or UI control circuitry 122 may, for example, provide means for performing operation 404. Operation 406 may comprise causing presentation of the marker in the position on the screen. The processor 110 may, for example, provide means for performing operation 406. Operation 408 may comprise determining a location for the person to stand such that object information representing the person is presented within the desired position on the screen in an instance in which the user takes the picture. The processor 110 may, for example, provide means for performing operation 408. Operation 410 may comprise causing the location to be provided to the user. The processor 110, user interface 116, and/or UI control circuitry 122 may, for example, provide means for performing operation 410.

FIG. 14 illustrates a flowchart according to another example method for providing markers for improved picture taking according to an example embodiment 500. The operations illustrated in and described with respect to FIG. 14 may, for example, be performed by, with the assistance of, and/or under the control of one or more of the processor 110, memory 112, communication interface 114, user interface 116, or UI control circuitry 122 (shown in FIG. 1). Operation 502 may comprise causing presentation of information representative of a live environment on a screen. The processor 110, user interface 116, and/or UI control circuitry 122 may, for example, provide means for performing operation 502. Operation 504 may comprise receiving user input defining a marker and a position of the marker on the screen over at least a portion of the live environment information. The processor 110, user interface 116, and/or UI control circuitry 122 may, for example, provide means for performing operation 504. Operation 506 may comprise causing presentation of the marker in the position on the screen. The processor 110 may, for example, provide means for performing operation 506. Operation 508 may comprise receiving user input indicating a user's desire to take a picture. The processor 110, user interface 116, and/or UI control circuitry 122 may, for example, provide means for performing operation 508. Operation 510 may comprise, in response, causing the picture of the live environment being presented on the screen to be taken. The processor 110 may, for example, provide means for performing operation 510.

FIGS. 12-14 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
    causing, by a processor, presentation of information representative of a live environment on a screen, wherein the presentation of information comprises presentation of a background object within the live environment on the screen;
    receiving user input defining a marker and a position of the marker using a height selection bar that is presented on the screen over at least a portion of the live environment information, wherein receiving user input comprises receiving user input via the height selection bar in order to modify a size of the marker that is to be presented at the position such that the marker, as modified, is differently sized in relation to the live environment information presented on the screen, and wherein a portion of the marker is repositioned relative to another portion of the marker in response to the user input; and
    causing presentation of the marker in the position on the screen with the size of the marker having been modified relative to the live environment information based upon the user input received via the height selection bar.

2. The method according to claim 1, wherein the position of the marker is associated with the desired position on the screen for object information, wherein the object information represents at least one of the person or the object of the live environment.

3. The method according to claim 2, wherein causing presentation of the marker in the position on the screen comprises causing presentation of the marker in the position on the screen to facilitate a user taking a picture of the live environment with the object information representing the at least one person or object being presented on the screen in the desired position.

4. The method according to claim 3 further comprising:
    determining a location for the person to stand such that the object information representing the person is presented within the desired position on the screen in an instance in which the user takes the picture; and
    causing the location to be provided to the user.

5. The method according to claim 4, wherein determining the location comprises determining a distance to the location, and wherein causing the location to be provided to the user comprises causing the distance to the location to be provided to the user.

6. The method according to claim 5, wherein determining the distance comprises determining an X coordinate distance and a Y coordinate distance to the location, wherein the X coordinate distance defines a distance in the left or right direction, and wherein the Y coordinate distance defines a distance in the forward or backward direction.

7. The method according to claim 2, wherein receiving user input defining the marker and the position of the marker comprises receiving user input defining the position of the marker to be representative of a three-dimensional position of the at least one person or object within the live environment.

8. A method according to claim 7, further comprising adjusting the position of the marker after the marker is presented on the screen, wherein adjusting the position of the marker comprises receiving user input that changes a size of the marker that is presented on the screen with the position of the marker being adjusted based upon a change in the size of the marker.

9. The method according to claim 2, wherein receiving user input defining the marker comprises receiving user input defining a geometric shape corresponding to the desired position on the screen for the object information representing the object.

10. The method according to claim 1, wherein the marker comprises a puppet generally defining the shape of a person.

11. The method according to claim 10, wherein receiving user input defining the marker comprises receiving user input repositioning a portion of the puppet with respect to the live environment information so as to define a pose.

12. A method according to claim 1, further comprising causing presentation of one or more height indicators positioned along the height selection bar, wherein a respective height indicator is indicative of a predefined size of the marker.

13. A method according to claim 1, wherein the portion of the marker is repositioned relative to the another portion of the marker that remains fixed in position.

14. A method according to claim 1, wherein the marker is one predefined shape selected by the user from among a plurality of different predefined shapes.

15. An apparatus comprising a processor and a memory including computer program code, the memory and the computer program code configured to, with the processor, cause the apparatus to:
cause presentation of information representative of a live environment on a screen, wherein the presentation of information comprises presentation of a background object within the live environment on the screen;
receive user input defining a marker and a position of the marker using a height selection bar that is presented on the screen over at least a portion of the live environment information, wherein the user input that is received comprises user input received via the height selection bar in order to modify a size of the marker that is to be presented at the position such that the marker, as modified, is differently sized in relation to the live environment information presented on the screen, and wherein a portion of the marker is repositioned relative to another portion of the marker in response to the user input; and
cause presentation of the marker in the position on the screen with the size of the marker having been modified relative to the live environment information based upon the user input received via the height selection bar.

16. The apparatus of claim 15, wherein the position of the marker is associated with the desired position on the screen for object information, wherein the object information represents at least one of the person or the object of the live environment.

17. The apparatus of claim 16, wherein the memory and the computer program code are further configured to, with the processor, cause the apparatus to cause presentation of the marker in the position on the screen to facilitate a user taking a picture of the live environment with the object information representing the at least one person or object being presented on the screen in the desired position.

18. The apparatus of claim 17, wherein the memory and the computer program code are further configured to, with the processor, cause the apparatus to:
determine a location for the person to stand such that the object information representing the person is presented within the desired position on the screen in an instance in which the user takes the picture; and
cause the location to be provided to the user.

19. The apparatus of claim 16, wherein the memory and the computer program code are further configured to, with the processor, cause the apparatus to receive user input defining the marker and the position of the marker by receiving user input defining the position of the marker to be representative of a three-dimensional position of the at least one person or object within the live environment.

20. The apparatus of claim 15, wherein the marker comprises a puppet generally defining the shape of a person.

21. The apparatus of claim 20, wherein the memory and the computer program code are further configured to, with the processor, causes the apparatus to receive user input defining the marker by receiving user input repositioning a portion of the puppet with respect to the environment information so as to define a pose.

22. An apparatus according to claim 15, wherein the portion of the marker is repositioned relative to the another portion of the marker that remains fixed in position.

23. An apparatus according to claim 15, wherein the marker is one predefined shape selected by the user from among a plurality of different predefined shapes.

24. At least one non-transitory computer-readable medium encoded with instructions that, when executed by a processor, are configured to:
cause presentation of information representative of a live environment on a screen, wherein the presentation of information comprises presentation of a background object within the live environment on the screen;
receive user input defining a marker and a position of the marker using a height selection bar that is presented on the screen over at least a portion of the live environment information, wherein user input that is received comprises user input received via the height selection bar in order to modify a size of the marker that is to be presented at the position such that the marker, as modified, is differently sized in relation to the live environment information presented on the screen, and wherein a portion of the marker is repositioned relative to another portion of the marker in response to the user input; and
cause presentation of the marker in the position on the screen with the size of the marker having been modified relative to the live environment information based upon the user input received via the height selection bar.

* * * * *